the presidents of the (12) United States Patent
Speer et al.

US011198773B2

(10) Patent No.: US 11,198,773 B2
(45) Date of Patent: Dec. 14, 2021

(54) METHOD AND FORMULATION FOR AN ISOCYANATE-FREE FOAM USING UNSATURATED POLYESTERS

(71) Applicant: Cryovac, LLC, Charlotte, NC (US)

(72) Inventors: Drew V. Speer, Simpsonville, SC (US); Christopher Scott, Raleigh, NC (US); Amber C. Rumple, Greenville, SC (US); Njamkou N. Noucti, Simpsonville, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/765,277

(22) PCT Filed: Nov. 19, 2018

(86) PCT No.: PCT/US2018/061735
§ 371 (c)(1),
(2) Date: May 19, 2020

(87) PCT Pub. No.: WO2019/099968
PCT Pub. Date: May 23, 2019

(65) Prior Publication Data
US 2020/0317883 A1 Oct. 8, 2020

Related U.S. Application Data

(60) Provisional application No. 62/588,691, filed on Nov. 20, 2017.

(51) Int. Cl.
*C08J 9/30* (2006.01)
*C08F 222/20* (2006.01)
*C08F 220/14* (2006.01)
*C08J 9/00* (2006.01)
*C08J 9/14* (2006.01)

(52) U.S. Cl.
CPC .............. *C08J 9/30* (2013.01); *C08F 220/14* (2013.01); *C08F 222/20* (2013.01); *C08J 9/0066* (2013.01); *C08J 9/146* (2013.01); *C08J 2203/184* (2013.01); *C08J 2333/14* (2013.01); *C08J 2335/02* (2013.01)

(58) Field of Classification Search
CPC ... C08J 9/30; C08J 9/0066; C08J 9/146; C08J 2203/184; C08J 2333/14; C08J 2335/02; C08J 2203/02; C08J 2203/142; C08J 2203/182; C08J 9/0023; C08J 9/0028; C08J 9/08; C08J 9/12; C08J 2201/026; C08J 2203/06; C08J 2203/162; C08J 2367/06; C08F 220/14; C08F 220/20; C08K 5/17; C08K 5/18; C08K 3/36; C08G 63/553
See application file for complete search history.

(56) References Cited

U.S. PATENT DOCUMENTS

| | | | |
|---|---|---|---|
| 3,367,890 A | 2/1968 | Mcmanimie | |
| 4,119,583 A * | 10/1978 | Filip | ...................... B29C 44/12 521/103 |
| 4,465,792 A | 8/1984 | Carr et al. | |
| 4,525,487 A * | 6/1985 | Ahnemiller | .............. C08J 9/105 521/128 |
| 4,626,570 A | 12/1986 | Gardner | |
| 5,945,461 A | 8/1999 | Gosiewski et al. | |
| 6,121,398 A | 9/2000 | Wool et al. | |
| 6,586,483 B2 | 7/2003 | Kolb et al. | |
| 6,646,033 B2 | 11/2003 | Wool et al. | |
| 6,794,483 B2 | 9/2004 | Loza et al. | |
| 6,900,261 B2 | 5/2005 | Wool et al. | |
| 6,900,621 B1 | 5/2005 | Gunther | |
| 7,326,752 B2 | 2/2008 | Mcalvin et al. | |
| 7,396,882 B2 | 7/2008 | Hewitt et al. | |
| 7,674,840 B2 | 3/2010 | Volker et al. | |
| 8,604,091 B2 | 12/2013 | Olang | |
| 8,633,257 B2 | 1/2014 | Wool | |
| 9,359,471 B2 | 6/2016 | Trumbo et al. | |
| 2008/0004369 A1 | 1/2008 | Seppala | |
| 2008/0281006 A1 | 11/2008 | O'Leary et al. | |
| 2010/0055468 A1 | 3/2010 | Cheng et al. | |
| 2011/0159135 A1 | 6/2011 | Desmarais | |

(Continued)

FOREIGN PATENT DOCUMENTS

EP 0269341 A2 6/1988
WO 2013077865 A1 5/2013

(Continued)

OTHER PUBLICATIONS

Laetitia M. Bonnaillie, et al., Thermosetting Foam with a High Bio-Based Content from Acrylated Epoxidized Soybean Oil and Carbon Dioxide, Journal of Applied Polymer Science, vol. 105, 1042-1052, 2007, Newark, DE, USA.
Laetitia M. Bonnaillie, Bio-Based Polymeric Foams from Soybean Oil and Carbon Dioxide, Dissertation at University of Delaware, 2007.
Jeffrey Klang, Design and Performance of Radiation Curable Acrylates with High Renewable Carbon Content, Sartomer USA LLC, presented at RadTech 2010 Technology Expo and Conference, May 2010, Exton, PA, USA.

(Continued)

*Primary Examiner* — Kara B Boyle
(74) *Attorney, Agent, or Firm* — Jason R. Womer

(57) ABSTRACT

The presently disclosed subject matter is directed to a method of making a foam, specifically, the development of isocyanate-free foams using at least one unsaturated polyester. The at least one unsaturated polyester is a reaction product of at least one unsaturated cyclic anhydride, dicyclopentadiene, and at least one polyol. The disclosed formulation further comprises at least one reactive diluent and at least one initiator. The disclosed formulations are cured by a free radical mechanism.

19 Claims, No Drawings

(56) References Cited

U.S. PATENT DOCUMENTS

2011/0159206 A1 6/2011 Merrigan et al.
2015/0024138 A1 1/2015 Figovsky et al.

FOREIGN PATENT DOCUMENTS

WO 2013101682 A1 7/2013
WO 2014189759 A1 11/2014

OTHER PUBLICATIONS

Jonny J Blaker, et al., Renewable Nanocomposite Polymer Foams Synthesized from Pickering Emulsion Templates, Green Chemistry, vol. 11, 1321-1326, 2009.

* cited by examiner

METHOD AND FORMULATION FOR AN ISOCYANATE-FREE FOAM USING UNSATURATED POLYESTERS

FIELD OF THE INVENTION

The presently disclosed subject matter relates generally to methods of making isocyanate-free foam using unsaturated polyesters.

BACKGROUND

It is known to produce foam from a reactive mixture of one or more polyols and one or more isocyanates. Isocyanates are highly reactive and toxic chemicals and new warning label requirements are being implemented. It is desirable to move away from the use of isocyanates where there is a potential for worker or consumer exposure. There are foams that use alternate chemistries to produce urethane linkages without using isocyanates. The presently disclosed matter offers methods of making isocyanate-free foams and the resulting isocyanate-free foam that does not rely on urethanes to produce the foam.

SUMMARY

The presently disclosed subject matter is directed to a method of making a foam and the foam thereof. In some embodiments, the formulation for making the foam may have at least one unsaturated polyester comprising a reaction product of at least one unsaturated cyclic anhydride, dicyclopentadiene, and at least one polyol. The formulation may also include at least one reactive diluent, and at least one initiator. The method may include providing a formulation. The method may also include expanding the formulation to create a froth. The method may further include curing the froth by free radical polymerization to produce a foam.

DETAILED DESCRIPTION

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a formulation" includes a plurality of such formulations, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, in some embodiments ±0.1%, and in some embodiments ±0.01%, from the specified amount, as such variations are appropriated in the disclosed foam and methods.

As used herein, the term "additive" refers to any substance, chemical, compound or formulation that is added to an initial substance, chemical, compound, or formulation in a smaller amount than the initial substance, chemical, compound, or formulation to provide additional properties or to change the properties of the initial substance, chemical, compound, or formulation.

As used herein, "polymerizable resin" refers to reactive molecules having three or more sites of ethylenic unsaturation that participate in forming covalent bonds during the free radical polymerization (i.e., have a functionality of three or more) to form larger molecules comprising multiples of the reactive molecules.

As used herein, "free radical", refers to an initiating free radical which is produced when an initiator is heated until a bond is homolytically cleaved. Another example of an initiating free radical is when an initiator produces the initiating free radical after the reaction of a promoter with the initiator.

As used herein, "acrylate" includes acrylates, methacrylates, and molecules having combinations of acrylate and methacrylate functionalities. "Acrylate functionality" includes functionality provided by any of acrylate and methacrylate moieties. "Acrylate moieties" includes acrylate and methacrylate moieties. As used in this context, "acrylate functionality" refers to the number of acrylate moieties on the molecule.

As used herein, "co-reactant" is a molecule having two or fewer sites of ethylenic unsaturation that participate in forming covalent bonds during the free radical polymerization of the polymerizable resin or unsaturated polyester (i.e., have a functionality of two or one). The co-reactant may be a reactive diluent, that is, co-reactant that can also act to lower the viscosity of a solution comprising the unsaturated polyester or polymerizable resin (i.e., act as a solvent or diluent for the unsaturated polyester or polymerizable resin). A co-reactant may be selected to improve one or more characteristics of the cured foam formulation, such as density, tensile strength, compressive strength, toughness, and/or modulus.

As used herein, "froth" is the expanded mixture at the initial period of the curing process (i.e., polymerization process) comprising the unsaturated polyester(s), co-reactants, reactive diluents, initiators, and other components and a plurality of cells within the mixture created by carbon dioxide and other gases that have come out of solution or have vaporized in response to the decrease in pressure or an increase in temperature. The froth exists before curing has been completed. The froth is a nascent foam. The transition from froth to foam may be defined as the point in the curing process where the cellular structure takes on a particular amount (e.g. approximately 80%) of its final properties such as density or compressive strength, or both density and compressive strength.

Copolymers can be identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mer" units derived from the monomers from which the copolymer is produced, e.g., a propylene/ethylene copolymer comprises propylene mer units and ethylene mer units.

All formulation percentages used herein are presented on a "by weight" basis, unless designated otherwise.

Although the majority of the above definitions are substantially as understood by those of skill in the art, one or more of the above definitions can be defined herein above in a manner differing from the meaning as ordinarily understood by those of skill in the art, due to the particular description herein of the presently disclosed subject matter.

The Disclosed Formulation

The presently disclosed subject matter is directed to methods of making a foam and the foam thereof. The foam may be a thermoset foam. The formulation may include at least one unsaturated polyester comprising a reaction product of at least one unsaturated cyclic anhydride, dicyclopentadiene, and at least one polyol. The formulation may also include at least one reactive diluent, and at least one initiator. The formulation may optionally further comprise a blowing agent, a surfactant, and at least one additive. The formulation may be in two parts: a first part and a second part. In some embodiments, the formulation may not be in two parts. The first part may be referred to as the A-side. The second part may be referred to as the B-side. The first part and the second part may be isolated from one another until mixing the first part and the second part is desired and a gaseous blowing agent may be generated. In some embodiments, the blowing agent is a physical blowing agent and is not chemically generated.

The formulation for making a foam may include at least one unsaturated polyester. The at least one unsaturated polyester may comprise diacids, unsaturated diacids, and various diols. Unsaturated polyesters may be the condensation products of dicarboxylic acids or anhydrides with difunctional alcohols. As used herein, the terms "unsaturated polyester" and "unsaturated polyester resin" (UPR) are synonymous. In some embodiments, the unsaturated polyesters may be those further modified with dicyclopentadiene (DiCP). Formulations comprising DiCP-modified unsaturated polyesters are beneficial due to high cure rate, low foam density, high compressive strength, and demonstrate a high loss modulus over a temperature range important for protective packaging applications. The temperature range important for protective packaging applications may be −10° C. to 40° C.

The unsaturated polyester may optionally include branching units. The branching unit is selected from one or more of polyfunctional alcohol units (e.g., pentaerythritol units or glycerol units) and multifunctional acid units (e.g., 1,1,3-propane tricarboxylic acid units or citric acid units) having a functionality of three or more, as described more fully herein.

The polyfunctional alcohol units are derived from polyfunctional alcohols having three or more hydroxyl groups or epoxide groups, for example, four or more hydroxyl groups. The polyfunctional alcohol units may comprise one or more of the following: pentaerythritol units, trimethylol-propane units, mannitol units, glycerol units, and polyglycerol units.

The multifunctional acid units are derived from multifunctional acids having three or more carboxyl groups, for example, four or more carboxyl groups, and/or their corresponding anhydrides. The multifunctional acids units may comprise one or more of the following: 1,1,3-propane-tricarboxylic acid units, citric acid units, tartaric acid units, pyromellitic dianhydride units, benzophenone tetracarboxylic dianhydride units, 1,1,2-ethanecarboxylic acid units, 1,2,3,4-butanetetracarboxylic acid units, and 1,2,3,4-cyclopentane-tetracarboxylic acid units.

The structure of the unsaturated polyester, that is, for example, whether it has a star configuration, a comb configuration, or a linear configuration, depends in part on the presence and amount of branching unit in the unsaturated polyester. For example, a pentaerythritol branching unit may produce a 4-arm star polymer molecule; whereas, using 1,4-butanediol units may produce a linear polymer molecule.

The unsaturated polyester may be substantially liquid at ordinary room temperature. The unsaturated polyester may also be soluble in suitable diluents. The solubility of UPR in suitable diluents may occur during the synthesis of the resin by various methods known to those skilled in the art to limit the molecular weight such that the resin and/or the resin with diluents has a manageable viscosity at room temperature. The number average molecular weight ($M_n$) may be less than 5,000 g/mol and preferably less than 2,500 g/mol. The manageable viscosity at room temperature may be less than 500,000 centipoise (cP) and preferably less than 50,000 cP.

The formulation may have 40 wt % to 60 wt % of at least one unsaturated polyester. The formulation may have 40 wt %, 42 wt %, 44 wt %, 46 wt %, 48 wt %, 49.39 wt %, 50 wt %, 50.89 wt %, 51.58 wt %, 52 wt %, 52.09 wt %, 52.5 wt %, 52.6 wt %, 52.8 wt %, 53.6 wt %, 54 wt %, 55.69 wt %, 56 wt %, 57.49 wt %, 57.69 wt %, 58 wt %, 60 wt %, or any range between these values. In some embodiments, the formulation may have 50 wt % to 55 wt % of at least one unsaturated polyester. In some embodiments, the formulation may have 54 wt % of at least one unsaturated polyester. In other embodiments, the formulation may have 53.6 wt % of at least one unsaturated polyester. In further embodiments, the formulation may have 52.8 wt % of at least one unsaturated polyester. The formulation may have 57.69 wt % of at least one unsaturated polyester. The formulation may have 52.6 wt % of at least one unsaturated polyester. The formulation may have 52.5 wt % of at least one unsaturated polyester. The formulation may have 52.09 wt % of at least one unsaturated polyester. The formulation may have 51.58 wt % of at least one unsaturated polyester. The formulation may have 50.89 wt % of at least one unsaturated polyester. The formulation may have 50 wt % of at least one unsaturated polyester. The formulation may have 49.39 wt % of at least one unsaturated polyester.

In some embodiments, the at least one unsaturated polyester may be in the first part of the formulation. In other embodiments, the at least one unsaturated polyester may be in the second part of the formulation. In further embodiments, the at least one unsaturated polyester may be in the first part and the second part of the formulation.

The at least one unsaturated polyester may be a reaction product of at least one unsaturated cyclic anhydride, DiCP, and at least one polyol. The at least one unsaturated polyester may be a reaction product of at least one unsaturated cyclic anhydride, and at least one polyol.

The unsaturated cyclic anhydride may be maleic anhydride, methyltetrahydrophthalic anhydride, tetrahydrophthalic anhydride, phthalic anhydride, or combinations thereof. The amount of unsaturated cyclic anhydrides determines in part the activity of the unsaturated polyester. In some embodiments, the unsaturated cyclic anhydride may be maleic anhydride. The reaction of maleic anhydride with the polyol produces maleate, which undergoes isomerization to fumarate. Fumarate can further increase the rate of the reaction to form an unsaturated polyester. The unsaturated polyester resin may also be derived in part from saturated dicarboxylic acids or anhydrides such as phthalic anhydride, succinic anhydride, isophthalic acid, and terephthalic acid.

The unsaturated polyester may be synthesized using 30 wt % to 60 wt % unsaturated cyclic anhydride. The unsaturated polyester may be synthesized using 30 wt %, 35 wt %, 40 wt %, 42 wt %, 44 wt %, 45 wt %, 46 wt %, 47 wt %, 48 wt %, 49 wt %, 50 wt %, 55 wt %, 60 wt % unsaturated cyclic anhydride, or any range between these values. In some embodiments, the unsaturated polyester may be synthesized using 45.87% unsaturated cyclic anhydride. In other embodiments, the unsaturated polyester may be synthesized using 45.87% maleic anhydride.

The unsaturated polyester may be synthesized using DiCP. The unsaturated polyester may be synthesized using 10 wt % to 30 wt % DiCP. The unsaturated polyester may be synthesized using 10 wt %, 11 wt %, 11.54 wt %, 12 wt %, 13 wt %, 14 wt %, 15 wt %, 16 wt %, 17 wt %, 18 wt %, 19 wt %, 20 wt %, 22 wt %, 24 wt %, 26 wt %, 28 wt %, 30 wt % DiCP, or any range between these values. In some embodiments, the unsaturated polyester may be synthesized using 11.54 wt % DiCP.

The at least one polyol may be ethylene glycol, diethylene glycol, propylene glycol, butane diol, neopentyl glycol, glycerol, pentaerythritol, 1,10-decanediol, sucrose, glucose, trimethylolpropane, sorbitol, or combinations thereof. The at least one polyol may have a molecular weight of 2900 or less. In some embodiments, the molecular weight may be a weight average molecular weight of 2900 or less. The at least one polyol may be ethylene glycol. The at least one polyol may be propylene glycol. The at least one polyol may be glycerol. The at least one polyol may be pentaerythritol. The at least one polyol may be neopentyl glycol.

The at least one polyol may be 2 polyols. The 2 polyols may be referred to as polyol 1 and polyol 2. The at least one polyol may be 3 polyols. In some embodiments, the at least one polyol may be ethylene glycol and propylene glycol. In other embodiments, the at least one polyol may be ethylene glycol, propylene glycol, and glycerol. In further embodiments, the at least one polyol may be ethylene glycol and glycerol. The at least one polyol may be propylene glycol and glycerol. The at least one polyol may be pentaerythritol and glycerol. The at least one polyol may be pentaerythritol and ethylene glycol.

The unsaturated polyester may be synthesized using 5 wt % to 40 wt % of at least one polyol. The unsaturated polyester may be synthesized using 5 wt %, 6 wt %, 8 wt %, 8.64 wt %, 10 wt %, 12 wt %, 15 wt %, 15.48 wt %, 16 wt %, 18 wt %, 20 wt %, 22 wt %, 24.12 wt %, 25 wt %, 26 wt %, 28 wt %, 30 wt %, 32 wt %, 34 wt %, 36 wt %, 38 wt %, 40 wt % of at least one polyol, or any range between these values. In some embodiments, the unsaturated polyester may be synthesized using 24.12 wt % of at least one polyol. In other embodiments, the unsaturated polyester may be synthesized using 15.48 wt % of polyol 1 and 8.64 wt % of polyol 2. In other embodiments, the unsaturated polyester may be synthesized using 10.95 wt % of polyol 1 and 8.63 wt % of polyol 2

The unsaturated polyester may be synthesized using at least one isomerization catalyst, at least one catalyst, at least one inhibitor, ethanol, and water. The at least one isomerization catalyst may be piperidine. The at least one catalyst may be triphenylphosphite. The at least one inhibitor may be hydroquinone, hydroquinone methyl ether (MEHQ), t-butylhydroquinone, t-butylcatechol, di-t-butylhydroquinone, or combinations thereof. The water may be distilled water, tap water, deionized water, or combinations thereof. The ethanol may act as an end-capping reagent to better control the molecular weight of the polymer. The unsaturated polyester may be prepared as described in U.S. Pat. No. 6,794,483, the contents of which are expressly incorporated herein.

The formulation for making a foam may include at least one reactive diluent. The foam may be a thermoset foam. The unsaturated polyesters may also be dissolved in a reactive diluent. The at least one reactive diluent may be 2-(hydroxyethyl)methacrylate, 2-(hydroxyethyl)methacrylate maleate (HEMA), acrylates, methacrylates, divinylbenzene, methyl methacrylate, phosphate esters of 2-(hydroxyethyl)methacrylate, phosphate esters of 2-(hydroxyethyl) acrylate (HEA), vinyl ethers, vinyl esters, vinyl toluene, styrene, or combinations thereof. In some embodiments, the at least one reactive diluent may be an acrylate. The acrylate may be HEA, HEMA, acrylated polyester oligomers, bisphenol A diacrylates, dipropylene glycol diacrylate, epoxy acrylates, ethoxylated trimethylolpropane triacrylate (TMPTA), isobornyl acrylate, methyl cinnamate, PEG 400 diacrylate, PEG 600 diacrylate, PEG 1000 dimethacrylate, pentaerythritol tetraacrylate, polyester acrylate, polyester acrylate oligomer, polyethylene glycol diacrylates, polypropylene glycol diacrylates, propylene glycol diacrylates, propoxylated trimethylolpropane triacrylate, trimethylolpropane triacrylate, tripropylene glycol diacrylate, tris (2-hydroxyethyl)isocyanurate triacrylate, zinc diacrylate, ethoxylated pentaerythritol tetraacrylate (SR494), dipentaerythritol pentaacrylate (SR399), dipentaerythritol, hexaacrylate pentaacrylate, tetraacrylate, or combinations thereof.

The formulation may have 10 wt % to 35 wt % of at least one reactive diluent. The formulation may have 10 wt %, 12 wt %, 14 wt %, 15 wt %, 16 wt %, 18 wt %, 19 wt %, 20 wt %, 22 wt %, 22.2 wt %, 24 wt %, 25 wt %, 26 wt %, 27.8 wt %, 28 wt %, 29 wt %, 30 wt %, 31.1 wt %, 32 wt %, 32.2 wt %, 34 wt %, 35 wt %, of at least one reactive diluent, or any range between these values. In some embodiments, the formulation may have 22.2 wt % of at least one reactive diluent. In other embodiments, the formulation may have 27.8 wt % of at least one reactive diluent. In other embodiments, the formulation may have 29 wt % of at least one reactive diluent. In further embodiments, the formulation may have 30 wt % of at least one reactive diluent. In other embodiments, the formulation may have 31.1 wt % of at least one reactive diluent. In other embodiments, the formulation may have 32.2 wt % of at least one reactive diluent.

In some embodiments, the at least one reactive diluent may be in the first part of the formulation. In other embodiments, the at least one reactive diluent may be in the second part of the formulation. In further embodiments, the at least one reactive diluent may be in the first part and the second part of the formulation.

A reactive diluent is a molecule having one or more sites of ethylenic unsaturation that participate in forming covalent bonds during the free radical polymerization of the unsaturated polyester. The reactive diluent can act to lower the viscosity of a solution comprising the unsaturated polyester (i.e., act as a solvent or diluent for the unsaturated polyester). A reactive diluent may be selected to improve one or more characteristics of the cured unsaturated polyester, such as tensile strength, compressive strength, toughness, and/or modulus.

Useful reactive diluents comprise one or more of styrene, alpha-methyl styrene, vinyl toluene, t-butylstyrene, diallyl phthalate, diallyl isophthalate, diallyl maleate, acrylate, methacrylates, triacrylates, tetraacrylates, pentaacrylates, and hexacrylates.

The reactive diluent may comprise acrylate, that is, one or more of monoacrylate and diacrylate. The reactive diluent may comprise monoacrylate, that is, molecules having a single acrylate functionality site. Useful monoacrylates include one or more of iso-bornyl acrylate, fatty alcohol monoacrylate (e.g., lauryl acrylate), cyclohexyl monoacrylates, ethoxylated phenol monoacrylates (e.g., four-mole ethoxylated nonyl phenol acrylate), epoxy acrylates (e.g., glycidyl methacrylate), and acrylated fatty acid ester.

The reactive diluent may comprise diacrylate, that is, molecules having two acrylate functionality sites. Useful diacrylates include, for example, one or more of polyethylene glycol diacrylates, polypropylene glycol diacrylates, bisphenol A diacrylates, diacrylates derived from vegetable oil, and polyester diacrylates.

Useful polyethylene glycol (PEG) diacrylate include PEG 200 diacrylate, PEG 400 diacrylate, and PEG 1000 diacrylate where the numbers represent the average molecular weight of the PEG segment.

Useful polypropylene glycol diacrylates include dipropylene glycol diacrylate, and tripropylene glycol diacrylate.

Useful bisphenol A diacrylates include ethoxylated bisphenol A diacrylate, such as those having 2, 3, and 4 or more moles of ethoxylation, and including bisphenol diacrylates and bisphenol A dimethacrylates.

The amount of reactive diluent relative to the unsaturated polyester may be at least any one of 5, 6, 7, 8, 10, 12, 15, 17, and 20 weight parts of the reactive diluent; and/or at most any one of 90, 80, 70, 60, 55, 50, 40, and 30 weight parts of the reactive diluent relative to 100 weight parts of the unsaturated polyester.

The reactive diluent may comprise an amount of acrylate (e.g., an amount of any of one or more of monoacrylate and/or diacrylate) of at least, and/or at most, any of 10%, 20%, 30%, 40%, 50%, 60%, 70%, 80%, 90%, 95%, and 99%, based on the weight of the reactive diluent. The reactive diluent may comprise monoacrylate, for example, of at least 1%, 5%, 10%, 15%, and 20%; and/or at most any of 40%, 30%, 20%, 10%, and 5%, based on the weight of the reactive diluent. The reactive diluent may comprise an amount of diacrylate, for example, of at least 6%, 7%, 8%, 10%, 12%, 15%, 17%, and 20%; and/or at most 60%, 55%, 50%, 40%, 30%, 20%, and 10%, based on the weight of the reactive diluent.

The formulation for making a foam may include at least one initiator. The initiator may be an azo compound, a peroxide, a persulfate, or combinations thereof. The azo compound may be, for example, but not limited to, azo nitriles, azo esters, azo amides, azo amidines, azo imidazolines, or combinations thereof. The at least one initiator may be a peroxide. In some embodiments, the at least one initiator may be a peroxide and amine combination. The peroxide may be benzoyl peroxide, dilauryl peroxide, 2,4-pentanedione peroxide, methyl ethyl ketone peroxide (MEKP), or combinations thereof. The peroxide may be barium peroxide, dibenzoyl peroxide, methyl ethyl ketone peroxide, hydrogen peroxide, sodium peroxide, t-butyl peroxybenzoate, or combinations thereof. The peroxide may be a solid, a liquid or a paste. The peroxide may be a finely milled solid. The peroxide may be a dibenzoyl peroxide. In some embodiments, the peroxide may be a dibenzoyl peroxide dispersion or solution. In other embodiments, the peroxide may be a benzoyl peroxide dispersion or solution. The dibenzoyl peroxide dispersion may be 40% dibenzoyl peroxide in a plasticizer.

In some embodiments, the formulation for making a foam has a peroxide that is dibenzoyl peroxide. Dibenzoyl peroxide splits homolytically into two free radicals that initiate polymerization of the at least one acrylate. The primary decomposition product of dibenzoyl peroxide is benzoic acid. In some embodiments, the foam produced may have benzoic acid in addition to the at least one acid that was in the formulation. The foam may have benzoic acid, citric acid, methacrylic acid, and/or their salts.

The formulation may have 0.5 wt % to 5 wt % peroxide. The formulation may have 1 wt %, 1.2 wt %, 1.5 wt %, 1.75 wt %, 2 wt %, 2.5 wt %, 2.75 wt %, 3 wt %, 3.25 wt %, 3.5 wt %, 3.75 wt %, 4 wt %, 4.02 wt %, 4.2 wt %, 4.5 wt %, 4.75 wt %, 5 wt % peroxide, or any range between these values. In some embodiments, the formulation may have 2 wt % of 40% dibenzoyl peroxide in a plasticizer. In other embodiments, the formulation may have 1.2 wt % 2,4-pentanedione peroxide. In further embodiments, the formulation may have 1.2 wt % 2,4-pentanedione peroxide and 3 wt % of 40% dibenzoyl peroxide in a plasticizer. In some embodiments, the formulation may have 4.02 wt % of 40% dibenzoyl peroxide in a plasticizer. In some embodiments, the formulation may have 2 wt % of 40% dibenzoyl peroxide in a plasticizer.

In some embodiments, the at least one initiator may be in the first part of the formulation. In other embodiments, the at least one initiator may be in the second part of the formulation.

The formulation may include at least one additive. The additive may be a nucleating agent, cure promoter, surfactants, dyes, flame retardants, pigment dispersing agents, functionalized filler, reactive filler, reinforcing agents, or combinations thereof. In some embodiments, the nucleating agent may be halloysite, powdered paper, silica, sodium cloisite, wood pulp, wood fiber, or combinations thereof. The nucleating agent may be a reactive filler. The nucleating agent may be a silica. The formulation may have less than 1 wt % of a reactive filler. The flame retardant may be aluminum trihydrate (ATH).

In some embodiments, the formulation may have 1 wt %, 1.25 wt %, 1.5 wt %, 1.75 wt %, 2 wt %, 2.25 wt %, 2.5 wt %, 2.75 wt %, 3 wt % nucleating agent, or any range between these values. The nucleating agent may be a silica. The silica may be hydrophobic fumed silica, synthetic amorphous silica, or a combination thereof. The fumed silica may have surface reactive methacrylate groups. The formulation may have 1 wt % synthetic silica. The formulation may have 1 wt % hydrophobic fumed silica. The formulation may have 2.5 wt % hydrophobic fumed silica. In some embodiments, the nucleating agent may be in the first part of the formulation. In other embodiments, the nucleating agent may be in the second part of the formulation. In further embodiments, the nucleating agent may be in the first part and the second part of the formulation.

In some embodiments, the cure promoter acts as a catalyst. The cure promoter may change the initiation temperature so the polymerization reaction may be thermally promoted at room temperature. The cure promoter may be an amine. The amine may be aromatic or aliphatic. The amine may be N,N-dimethyl aniline, N-methylaniline, N,N-dimethyltoluidine, N-methyltoluidine, N-(2-hydroxyethyl)-N-methyl-para-toluidine, N-alkyl aniline, N-alkyl toluidine, or combinations thereof. The amine may be N-(2-hydroxyethyl)-N-methyl-para-toluidine (MHPT). The cure promoter may also be a transition metal salt, in particular, a fatty acid transition metal salt. Examples of metals may include cobalt, manganese, copper, and iron.

The formulation may have 0.5 wt % to 2.5 wt % cure promoter. The formulation may have 0.5 wt %, 0.75 wt %, 1 wt %, 1.25 wt %, 1.5 wt %, 1.75 wt %, 2 wt %, 2.25 wt %, 2.5 wt % cure promoter, or any range between these values. The formulation may have 0.75 wt % cure promoter. In some embodiments, the formulation may have 1.5 wt % cure promoter. The cure promoter may be MHPT. The cure promoter may be in the first part of the formulation. The cure promoter may be in the second part of the formulation.

The at least one additive may be a surfactant. The surfactant may be a polysiloxane (silicone)-based surfactant. The surfactant may include alkoxylated polysiloxanes (i.e., silicone surfactants and propoxylated and/or ethoxylated polysiloxane), ethoxylated fatty acids, salts of fatty acids, ethoxylated fatty alcohols, salts of sulfonated fatty alcohols, fatty acid esters of sorbitan, and fatty acid ester sorbitan ethoxylates (e.g., polysorbates available from Croda under the Tween and Span trade names), or combinations thereof. In some embodiments, the surfactants may be Tegostab materials from Evonik and Dabco products from Air Products. The at least one additive may be a nucleating agent and a surfactant. The at least one additive may be silica and a polysiloxane-based surfactant. The at least one additive may be silica, a polysiloxane-based surfactant, and a cure promoter. The at least one additive may be silica, polysiloxane-based surfactant, and MHPT.

The formulation may have less than 2 wt % of a surfactant. The formulation may have 0.2 wt %, 0.4 wt %, 0.5 wt %, 0.6 wt %, 0.8 wt %, 1 wt %, 1.2 wt %, 1.4 wt %, 1.6 wt %, 1.8 wt %, 1.9 wt %, 1.95 wt %, 1.99 wt % of a surfactant. In some embodiments, the formulation may have 0.4 wt % of a surfactant. In other embodiments, the formulation may have 0.8 wt % of a surfactant. In further embodiments, the formulation may have 1.6 wt % of a surfactant.

In some embodiments, the surfactant may be in the first part of the formulation. In other embodiments, the surfactant may be in the second part of the formulation. In further embodiments, the surfactant may be in the first part and the second part of the formulation.

The formulation may include a physical or chemical blowing agent. The blowing agent may be acetone, cyclopentane, carbon dioxide, dimethoxymethane, nitrogen, ammonium bicarbonate, potassium bicarbonate, sodium bicarbonate, hydrocarbons, hydrofluorocarbons, hydrofluoro olefins, water, or combinations thereof. In some embodiments, the blowing agent may be a chemical blowing agent. In other embodiments, the blowing agent may be a physical blowing agent.

A physical blowing agent is a blowing agent that does not require a chemical reaction to generate the foaming gas or vapor, the latter being characterized as a chemical blowing agent. Useful physical blowing agents include one or more of inorganic blowing agents and organic blowing agents. Preferred blowing agents will have a sufficient solubility in the reactants to produce a low density foam. The solubility of gaseous blowing agents will typically increase with applied pressure.

The blowing agent may be a chemical blowing agent and the formulation may have two parts, wherein the first part may have a reactive acidic diluent and the second part may have a salt of bicarbonate or carbonate. In other embodiments, the blowing agent may be a physical blowing agent. The blowing agent may be hydrofluorocarbon-1,1,1,3,3-pentafluoropropane. The blowing agent may be trans-1,3,3,3-tetrafluoroprop-1-ene. The blowing agent may be hydrofluorocarbon-1,1,1,3,3-pentafluoropropane and trans-1,3,3,3-tetrafluoroprop-1-ene. The blowing agent may be 1,1,1,3,3-pentafluoropropane.

Useful inorganic blowing agents include one or more of carbon dioxide, nitrogen, argon, water, air, sulfur hexafluoride ($SF_6$), and helium. For example, the formulation may comprise carbon dioxide dissolved in the unsaturated polyester. The solubility of carbon dioxide will typically increase with increasing pressure.

Useful organic blowing agents include one or more of aliphatic hydrocarbons having 1-9 carbon atoms, aliphatic alcohols having 1-3 carbon atoms, fully and partially halogenated aliphatic hydrocarbons (e.g., those having 1-4 carbon atoms), hydrofluorocarbons (HFCs), chlorofluorocarbons, hydrochlorofluorocarbons, esters such as methyl formate, methyl acetate, ethers such as dimethyl ether, diethyl ether, and ketones, such as acetone.

Aliphatic hydrocarbons include methane, ethane, propane, n-butane, isobutane, n-pentane, isopentane, neopentane, cyclopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbon blowing agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, 1,1,1,3,3-pentafluoropropane (HFC-245a), perfluoropropane, dichloropropane, difluoropropane, perfluorobutane, and perfluorocyclobutane. Partially halogenated chlorocarbons and chlorofluorocarbon blowing agents include methyl chloride, methylene chloride, ethyl chloride, 1,1,1-trichloroethane, 1,1-dichloro-1 fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,2-dichlorotetrafluoroethane (CFC-114), chloroheptafluoropropane, and dichlorohexafluoropropane.

The blowing agent may comprise one or more of the foregoing blowing agents used alone or in combination. For example, the blowing agent may comprise a blend of from 35 wt % to 65 wt % isobutane and from 35 wt % to 65 wt % n-butane.

The formulation may have 10 wt % to 60 wt % blowing agent. The formulation may have 10 wt %, 12 wt %, 14 wt %, 15 wt %, 16 wt %, 18 wt %, 20 wt %, 22 wt %, 24 wt %, 26 wt %, 28 wt %, 30 wt %, 32 wt %, 34 wt %, 35 wt %, 40 wt %, 45 wt %, 46 wt %, 48 wt %, 50 wt %, 52 wt %, 54 wt %, 56 wt %, 58 wt %, 60 wt % blowing agent, or any range between these values. The formulation may have 20 wt % to 25 wt % blowing agent. In some embodiments, the formulation may have 28 wt % blowing agent. In other embodiments, the formulation may have 56 wt % blowing agent. The formulation may have 14 wt % blowing agent.

In some embodiments, the blowing agent may be in the first part of the formulation. In other embodiments, the blowing agent may be in the second part of the formulation. In further embodiments, the blowing agent may be in the first part and the second part of the formulation.

Methods of Making the Disclosed Formulation

The method of making the foam, may include providing a formulation.

The foam may be a thermoset foam. The formulation may be a liquid formulation. The formulation may include at least one unsaturated polyester comprising a reaction product of at least one unsaturated cyclic anhydride, DiCP, and at least one polyol. The formulation may also include at least one reactive diluent. The formulation may further include at least one initiator. The method may also include expanding the formulation to create a froth. The method may further include curing the froth by free radical polymerization to produce a foam.

The synthesis of the unsaturated polyester may be performed in three steps. In step one, maleic anhydride and ethanol are mixed together. The ingredients may be heated to about 35-50° C. with stirring until all of the maleic anhydride has reacted or solubilized. In some embodiments, the mole ratio of maleic anhydride to ethanol may be less than 1:2. In other embodiments, the mole ratio of maleic anhydride to ethanol may be 1:1 or 1:0.5. Then, distilled water and DiCP may be added and the reaction temperature may be increased. In some embodiments, the sum of the moles of water and the moles of ethanol may be less than or equal to the initial moles of maleic anhydride. In step 2, a mixture of two polyols may be added to the reaction mixture along with hydroquinone and triphenylphosphite and the temperature may be increased again. In some embodiments, step 2 may induce polycondensation. In step 3, two polyols may be added to the reaction mixture along with piperidine. In some embodiments, the two polyols may be the same polyol. In some embodiments, where there is a higher molecular weight unsaturated polyester, a nitrogen purge for two to three hours may be used in step 3 to drive the polycondensation by assisting in the removal of water vapor from the reaction mixture.

The unsaturated polyester may comprise the reaction product of ethanol, maleic anhydride, DiCP, and at least one polyol. The unsaturated polyester may also include piperidine and triphenyl phosphite. The unsaturated polyester may have 10 wt % to 25 wt % ethanol, 35 wt % to 55 wt % maleic anhydride, 5 wt % to 15 wt % DiCP, 15 wt % to 35 wt % at least one polyol, less than 1 wt % piperidine, less than 0.1 wt % triphenyl phosphite. In some embodiments, the unsaturated polyester may comprise 16.66 wt % ethanol, 45.87 wt % maleic anhydride, 11.54 wt % DiCP, 15.48 wt % diethylene glycol, 8.64 wt % hydroquinone, 0.11 wt % piperidine, 0.01 wt % triphenyl phosphite.

The formulation may have at least one unsaturated polyester comprising a reaction product of at least one unsaturated cyclic anhydride, dicyclopentadiene, and at least one polyol. The formulation may also have at least one reactive diluent, and at least one initiator. The unsaturated polyester may be blended with the reactive diluent and free radically cured using the at least one initiator. When the formulation has a cure promoter, the cure promoter needs to be kept separated from the initiator before the polymerization.

The formulation may have two parts and a first part may have the cure promoter and a second part may have the at least one initiator. In some embodiments, where the cure promoter is in the first part, the first part may also have at least one reactive diluent and at least one unsaturated polyester. Wherein the cure promoter is in the first part, the second part may have at least one initiator, the second part may also have at least one reactive diluent and at least one unsaturated polyester.

In other embodiments, the first part may have the at least one initiator. Wherein the first part may have at least one initiator, the first part may also have at least one reactive diluent and at least one unsaturated polyester. Wherein the first part may have the at least one initiator, the second part may have the cure promoter, and the second part may also have the at least one reactive diluent and the at least one unsaturated polyester.

In some embodiments, the method may further include activating the at least one initiator. Activating the initiator may occur upon mixing and formation of the froth. In some embodiments, the formulation may not have a promoter. The cure may be thermally triggered, and then a chemical promoter would not be necessary. Thermal triggering may be done by heating the formulation by any conventional means known to one of skill in the art. In an embodiment where the formulation does not have a cure promoter, then it would not be necessary to have two parts (A-side and B-side) and all of the components of the formulation would be provided together.

The formulation may have a blowing agent comprising a chemical blowing agent comprising a reactive acidic component and a salt of bicarbonate or carbonate. The formulation may have a blowing agent comprising a chemical blowing agent comprising a reactive acidic component and a salt of bicarbonate or carbonate, and the formulation may have two parts, wherein the first part may have the cure promoter and the reactive acidic component and the second part may have the at least one initiator and the salt of bicarbonate or carbonate. The acidic component may also serve as a reactive diluent. The formulation may have a blowing agent comprising a chemical blowing agent comprising a reactive acidic component and a salt of bicarbonate or carbonate, and the formulation may have two parts, wherein the first part may have at least one initiator and the reactive acidic diluent and the second part may have the cure promoter and the salt of bicarbonate or carbonate. The salt of bicarbonate or carbonate reacts with the acid to generate a gaseous blowing agent. The gas may be carbon dioxide. The salt of bicarbonate may be sodium bicarbonate.

In some embodiments, a blowing agent may be generated during the step of mixing. In some embodiments, a blowing agent may be added during the step of mixing. The blowing agent may be a generated gaseous blowing agent. In some embodiments the generated gaseous blowing agent is carbon dioxide.

Wherein the formulation may have a first part and a second part, the first and the second part may be hand mixed or mixed by a machine. The mixing device may be a static mixing device. The mixing device may be a disposable mixing device. In some embodiments, the step of combining is performed with a static mixer. In other embodiments, the mixing may be impingement of the A-side and the B-side within a mixing chamber with high enough velocity to provide chaotic mixing.

Mixing of the formulation when making the foam may be done at various temperatures. In some embodiments, the step of combining may be done at ambient temperature. In other embodiments, the step of combining may be done at a temperature of 5° C. to 60° C. The temperature may be 5° C., 10° C., 15° C., 20° C., 25° C., 30° C., 35° C., 40° C., 45° C., 50° C., 55° C., 60° C., or any range between these values.

The formulation may be combined at a mixing pressure of, for example, at least any one of 10 psig, 100 psig, 200 psig, 300 psig, 350 psig, 500 psig, and 800 psig, for example in a mixing chamber to form a resulting mixture. In some embodiments, lower pressure may be preferred for safety reasons and to keep costs low. The resulting mixture may have an initial temperature, for example, of at least 5° C., 10° C., 20° C., 30° C., 40° C., 50° C., and 60° C. or any range between these values. The curing reaction begins upon mixing, for example, within a mixing chamber.

Simultaneously or soon after the mixing, the resulting mixture may be expanded to create a froth. The froth may be transported to a dispensing chamber that connects the mixing chamber to the dispensing chamber. The dispensing chamber may dispense the froth using steam. In some embodiments, the method may further include activating the initiator in the froth.

The step of expanding the formulation to create the froth may occur by discharging the mixture from a mixing chamber directly to ambient conditions, or alternatively by discharging the mixture into a dispensing chamber. In the latter case, the froth may then be discharged from a dispensing chamber to allow the curing process to proceed to completion and create the foam outside of the dispensing chamber. The method of making a foam may further include curing the froth by free radical polymerization to produce a foam.

A blowing agent may be generated during mixing of the formulation. In some embodiments, a blowing agent may be added during mixing of the formulation. The blowing agent may be a generated gaseous blowing agent. In some embodiments the generated gaseous blowing agent is carbon dioxide. In some embodiments, the generated gaseous blowing agent may be added before mixing. In other embodiments, the generated gaseous blowing agent may be added while mixing, for example at the beginning of mixing.

The unsaturated polyester along with any of the additional ingredients within the froth are cured to create a solidified matrix surrounding or encasing the cellular structure of the plurality of cells to create the foam. In some embodiments, the cure may be achieved by peroxide initiated free radical cross-linking of the at least one unsaturated polyester. The peroxide may be initiated either thermally and/or by a promoter to initiate at room temperature or below. The temperature of the mixture or froth may be elevated in a controlled fashion to help control the rate of the curing reaction, as well as potentially extending the curing reaction. Typically the curing is exothermic, so that the temperature of the system will typically rise after initiation of the curing reaction. The curing may be 10 seconds, 20 seconds, 30 seconds, 40 seconds, 50 seconds, 1 minute, 2 minutes, 3 minutes, 4 minutes, or any range between these values. In some embodiments, the foam may be tack free in 2 minutes or less. In other embodiments, the foam may be tack free in 2 minutes, 110 seconds, 100 seconds, 90 seconds, 80 seconds, 70 seconds, 60 seconds, 50 seconds, 40 seconds, 30 seconds, 20 seconds, 10 seconds, or any range between these values. The term "tack free" is the period from the start of the cure to a point when the foam is sufficiently robust to resist damage by touch or in ad hoc testing. Tack free time can be determined as the point when the surface of the foam is no longer sticky when touched.

Foam

The foam may have a density of less than 30 pounds per cubic foot (pcf). The foam may have a density less than 4 pcf. The foam may have a density of less than 2 pounds pcf. The foam may have a density of 0.25 pcf, 0.5 pcf, 1.0 pcf, 1.1 pcf, 1.2 pcf, 1.3 pcf, 1.4 pcf, 1.5 pcf, 1.6 pcf, 1.7 pcf, 1.8 pcf, 1.9 pcf, 2.0 pcf, 2.1 pcf, 2.5 pcf, 3.0 pcf, 4.0 pcf, and 5.0 pcf, or any range between these values. In some embodiments, the foam may have a density of less than or equal to 3.0 pcf. For protective packaging (e.g., cushioning) applications, lower densities are typically preferred. Unless otherwise noted, the density of the foam as used herein is the apparent density measured according to ASTM D1622-08, which is incorporated herein in its entirety by reference.

The foam may have a compressive strength at 10% strain of less than 40 psi. In some embodiments, the foam may have a compressive strength at 10% strain of 1-15 psi. In other embodiments, the foam may have a compressive strength at 10% strain of 3-7 psi. The foam may have a compressive strength at 10% strain of at least any of the following: 0.1 psi, 0.5 psi, 0.8 psi, 1 psi, 1.1 psi, 1.2 psi, 1.3 psi, 1.4 psi, 1.5 psi, 2 psi, 2.5 psi, 3 psi, and 3.5 psi, 4 psi, 4.5 psi, 5 psi, 5.5 psi, 6 psi, 6.5 psi 7 psi, 8 psi, 9 psi, 10 psi, 11 psi, 12 psi, 13 psi, 14 psi, 15 psi, or any range between these values. In some embodiments the foam may have a compressive strength of greater than or equal to 1 psi at 10% strain. As used herein, the compressive strength is measured according to ASTM 1621-00, as modified by reference to 10% strain.

The foam may have a compressive strength at 25% strain of at least any of the following: 0.8 psi, 0.9 psi, 1 psi, 1.2 psi, 1.3 psi, 1.4 psi, 1.5 psi, 1.6 psi, 1.7 psi, 1.8 psi, 1.9 psi, 2 psi, 2.5 psi, 3.0 psi, 3.5 psi, 4 psi, 4.5 psi, 5 psi, 5.5 psi, 6 psi, 6.5 psi, 7 psi, 8 psi, 9 psi, 10 psi, 11 psi, 12 psi, 13 psi, 14 psi, 15 psi, or any range between these values, for example at from 10 to 50% compression. As used herein, the compressive strength is measured according to ASTM 1621-00, as modified by reference to 25% strain.

The foam may have a compressive strength at 50% strain of at least any of the following: 0.8 psi, 1 psi, 1.1 psi, 1.2 psi, 1.3 psi, 1.4 psi, 1.5 psi, 1.6 psi, 1.7 psi, 1.8 psi, 1.9 psi, 2 psi, 2.1 psi, 2.2 psi, 2.3 psi, 2.4 psi, 2.5 psi, 3 psi, 3.5 psi, 4 psi, 4.5 psi, 5 psi, 5.5 psi, 6 psi, 6.5 psi, 7 psi, 8 psi, 9 psi, 10 psi, 11 psi, 12 psi, 13 psi, 14 psi, 15 psi, or any range between these values, for example at from 10 to 50% compression. As used herein, the compressive strength is measured according to ASTM 1621-00, as modified by reference to 50% strain.

The foam may have a configuration, for example, of any of a sheet, plank, slab, block, board, and molded shape. The foam may be a solid foam. The foam may be used for any one or more of void fill, blocking or bracing, thermal insulation, cushioning, package cushioning, sound insulation, or vibration dampening.

In preferred embodiments, the formulations used to make the foam are free of isocyanate reactants, such as those used in formulating polyurethane foams, so that the final foam of the present disclosure is free from isocyanates or isocyanate residues. Foam formulations comprising DiCP-modified unsaturated polyesters may be preferred due to having low foam density and high compressive strength. These foams also demonstrate a high loss modulus over a temperature range that is important for protective packaging applications (−10° C. to 40° C.).

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Example 1

Unsaturated Polyester Resin Preparation and Foam Analysis

Several unsaturated polyester resins were prepared as seen in Table 1. The synthesis of the unsaturated polyester may be performed in three steps. In step one, maleic anhydride and ethanol may be placed in a resin kettle equipped with mechanical stirring, a water cooling condenser, and a thermocouple. The reactor may be heated to about 35-50° C. with stirring until all of the maleic anhydride has reacted or solubilized. Then, distilled water and dicyclopentadiene (DiCP) may be added and the reaction temperature may be increased to 125° C. The reaction may be aged at 125° C. until the acid value of the reaction mixture is about 280 or less. In step 2, a mixture of two polyols may be added to the reaction mixture along with hydroquinone and triphenylphosphite, and the temperature may be increased to 195° C. The reaction mixture may be heated with distillation until the acid value reaches about 170 or less. In step 3, two polyols may be added to the reaction mixture along with piperidine. The two polyols may be the same polyol. Heating with distillation may continue at 195° C. until the acid value drops below 50. Optionally, a nitrogen purge for two to three hours may be used in step three to drive the polycondensation by assisting in the removal of water vapor from the reaction mixture.

Several different unsaturated polyester compositions were prepared and tested based on modifications of the composition, molecular weight, and architecture of the unsaturated polyester resin. The composition of the reactive diluents was also evaluated to determine if any of these variables had effects on the density and compressive strengths of the foams prepared using these unsaturated polyester resin compositions. The composition of the unsaturated polyester resin tests are listed below in Table 1.

TABLE 1

| Ingredients | UPR 1 (g) | UPR 2 (g) | UPR 3 (g) | UPR 4 (g) | UPR 5 (g) | UPR 6 (mol %) | UPR 7 (mol %) | UPR 8 (g) |
|---|---|---|---|---|---|---|---|---|
| ethanol | — | 271.81 | 217.45 | 260.30 | 213.76 | About 30% | About 30% | 213.75 |
| tetrahydrophthalic anhydride | 313.4 | — | — | — | — | — | — | — |
| maleic anhydride | 387.3 | 676.61 | 541.29 | 549.14 | 588.36 | About 35% | About 35% | 588.36 |
| diethylene glycol | 766.2 | 439.34 | 351.47 | 424.48 | 424.48 | About 21% | About 21% | — |
| dicyclopentadiene | — | 342.13 | 273.71 | 296.13 | 296.13 | About 13% | About 13% | 148.1 |
| hydroquinone (at 100 ppm) | 0.733 | 0.1712 | 0.1366 | 0.1366 | 0.1366 | — | — | 0.13 |
| titanium (IV) butoxide | 1.359 | — | — | — | — | — | — | — |
| Piperidine at 0.1% | — | 1.7119 | 1.3659 | 1.3659 | 1.3659 | — | — | — |
| triphenyl phosphite (at 100 ppm) | — | 0.1712 | 0.1366 | 0.1366 | 0.1366 | — | — | 0.13 |
| water | 108.27 | 45.04 | 36.03 | 36.03 | 21.62 | — | — | 21.6 |
| water produced | — | 63.05 | 54.05 | 54.05 | 39.63 | — | — | — |
| Piperidine | 1.359 | — | — | — | — | — | — | — |
| Ethylene glycol | — | — | — | — | — | — | — | 248.27 |

UPR 6 and 7 listed in Table 1 has mol % ranges instead of specific gram weight as the laboratory notebook with the ingredient list and amount was lost during a laboratory move. The inventors have given a mol % estimate based on their best knowledge. UPR 8 listed in Table 1 has ethylene glycol in part 2 at 140.52 g part 3 at 107.75 g. The property of the unsaturated polyester resin was modified by changing the polyols. Table 2 shows that by changing the resin architecture, there was a pronounced effect on the foam properties. The reactive diluent mixture was 1:1:1 (2-hydroxyethyl)methacrylate (HEMA)/polyester acrylate oligomer/dipropylene glycol diacrylate, the surfactant used was Tegostab B 8863, the amine was MHPT, a functionalized filler was used (Aerosil R7200), the peroxide was Perkadox L-40, and the blowing agent was HFC-245fa. The polyol architecture tried was linear with 100% ethylene glycol (EG), branched with 100% propylene glycol (PG), and networked with 80% EG and 20% glycerol (G).

TABLE 2

| Resin Architecture | Linear | Branched | Networked |
|---|---|---|---|
| Polyol 1/Polyol 2 | 100% EG | 100% PG | 80% EG/20% G |
| Density (pcf) | 1.6 | 7.8 | 2.6 |
| Compressive Strength at 10% strain (psi) | 0.06 | 0.22 | 0.17 |
| Rise time (mm:ss) | 6:02 | 2:42 | 1:21 |

The branched polyol architecture did not cure at 4 minutes, and the foam collapsed at 2 minutes, 42 seconds, which is the value in the rise time row in Table 2. The networked polyol architecture used less blowing agent. It was shown that branched and networked unsaturated polyester resins have less flexibility and require more strain to reshape. This property is reflected by the compressive strength of the foam at 10% strain. Using a branched unsaturated polyester resin resulted in a 3.7 fold improvement in compressive strength, however, the cure rate and foam density were adversely affected. Using a networked unsaturated polyester resin resulted in a 2.8 fold improvement in compressive strength with simultaneous improvements in cure rate. Further improvements were realized by modifying the reactive diluents as shown in Table 3. The reactive diluent composition for UPR 9 was the composition from Table 2 and there was less blowing agent used in UPR 9.

TABLE 3

|  | UPR 9 | UPR 9 | UPR 10 | UPR 10/11 |
|---|---|---|---|---|
| Density (pcf) | 2.6 | 2.2 | 3 | 2.3 |
| Compressive Strength at 10% strain (psi) | 0.17 | 3 | 9.6 | 3.5 |
| Rise time (mm:ss) | 1:21 | 0:40 | 0:32 | 0:24 |

The reactive diluent mixture was 1:2 HEMA/pentaacrylate, the surfactant used was Tegostab B 8863, the amine was MHPT, a functionalized filler was used (Aerosil R7200), the peroxide was Perkadox L-40, and the blowing agent was HFC-245fa. By replacing the polyester acrylate oligomer and pentaacrylate with a higher functionalized reactive diluent, the results led to a 17.6 fold improvement in compressive strength with a 0.85 fold decrease in density. Additionally, the rise time and cure rate of the foam also improved. The foams described in Table 3 were friable in nature. The friability could be reduced by replacing a small amount of pentaacrylate with the polyester acrylate oligomer.

The improved properties achieved by modifying the reactive diluents were consistent among different resin types that were further tested. Results are shown in Table 4 below.

TABLE 4

|  |  |  |  | Reactive Diluent: 1:1:1 | | | Reactive Diluent: 1:2 | | |
|---|---|---|---|---|---|---|---|---|---|
| Sample | MW | Composition | Architecture | Density (pcf) | Compressive Strength (CS) (10%) | Ratio CS/Density | Density (pcf) | Compressive Strength (CS) (10%) | Ratio CS/Density |
| 1 | 6360 | Blend of 3 | Mix of linear & networked | — | — | — | 3 | 9.6 | 3.2 |
| 2 | 8920 | 80% EG/20% G | Random late network | — | — | — | 3.6 | 7.2 | 2 |
| 3 | 2170 | 100% PG | Branched | 7.8 | 0.22 | 0.028 | 7.2 | 12.2 | 1.69 |
| 4 | 3270 | 80% PE/20% G | Branched network | — | — | — | 3.2 | 4.6 | 1.44 |
| 5 | 6260 | Blend of 3 | Mix of linear and networked | — | — | — | 2.4 | 3.3 | 1.38 |
| 6 | 3560 | 80% EG/20% G | Random late network | 2.6 | 0.17 | 0.065 | 2.2 | 3 | 1.36 |
| 7 | 4760 | 80% EG/20% G | Block network | 2.9 | 0.3 | 0.1 | 2.1 | 2.6 | 1.24 |
| 8 | 2510 | 100% EG | Linear | 1.6 | 0.06 | 0.038 | 3.8 | 4.2 | 1.11 |
| 9 | 1670 | 100% NPG | Branched | Foam collapsed and was very slow to cure | | | 7.8 | 4.8 | 0.62 |
| 10 | 4100 | 80% EG/20% PE | Random late network | 4.2 | 0.32 | 0.08 | 1.8 | 1 | 0.56 |
| 11 | 2370 | 80% EG/20% G | Random/network | 8.6 | 0.57 | 0.066 | 2.2 | 0.92 | 0.42 |
| 12 | 2450 | 80% EG/20% PE | Random late network | — | — | — | 2 | 0.43 | 0.22 |

By changing the reactive diluent from 1:1:1 HEMA/polyester acrylate oligomer/dipropylene glycol diacrylate to 1:2 HEMA/pentaacrylate, consistent improvements in compressive strength and, in most cases, simultaneous improvements in density. Additionally, this change also resulted in improved compressive strength/density ratios. The highest compressive strength to density ratios were obtained with branched or networked resins or with blends containing networked resins. The lowest compressive strength to density ratios were obtained with linear resins or with lower molecular weight resins.

Foams using a chemically generated blowing agent were also evaluated for their density, compressive strength, and rise time. The results are in Table 5. UPR 13 had 10% HFC245-fa and UPR 14 had less water than the other UPRs in Table 5.

TABLE 5

|  | UPR 12 | UPR 13 | UPR 14 |
|---|---|---|---|
| Density (pcf) | 2.3 | 4.1 | 2.7 |
| Compressive Strength at 10% strain (psi) | 1.5 | 3.4 | 3.2 |
| Rise time (mm:ss) | 1:30 | 0:29 | 1:30 |

The reactive diluent mixture was 1:2 HEMA/pentaacrylate, the surfactant used was Tegostab B8863, the amine was MHPT, a functionalized filler was used (Aerosil R7200), the peroxide was Perkadox L-40, the reactive diluent was methacrylic acid, and the solvent was water. The acid functionality in methacrylic acid was used in conjunction with sodium bicarbonate to generate carbon dioxide gas and water while the unsaturated functionality of methacrylic acid participates in an exothermic free radical polymerization. The exotherm generated from the free radical cure drove the endothermic acid-base reaction of methacrylic acid and sodium bicarbonate towards the production of gaseous products.

The molecular weight of the unsaturated polyesters were also examined to determine if the molecular weight had any effect on the foam properties. The results are shown in Table 6.

TABLE 6

|  | UPR 15 | UPR 9 | UPR 16 |
|---|---|---|---|
| $M_w$ [weight average MW] | 1770 | 3560 | 8920 |
| $M_n$ [number average MW] | 756 | 958 | 1250 |
| Density (pcf) | 2.5 | 2.2 | 3.6 |
| Compressive Strength at 10% strain (psi) | 1.5 | 3 | 7.2 |
| Rise time (mm:ss) | 1:01 | 0:40 | 0:20 |

The unsaturated polyester composition was 80% ethylene glycol and 20% glycerol. The reactive diluent mixture was 1:2 HEMA/pentaacrylate, the surfactant used was Tegostab B 8863, the amine was MHPT, a functionalized filler was used (Aerosil R7200), the peroxide was Perkadox L-40, and the blowing agent was HFC-245fa. When the polymer's molecular weight was increased, there was a greater effect on compressive strength than on density. When the molecular weight was increased by 5.04, the compressive strength was improved by 4.8 with a 1.44 fold increase in density.

In conclusion, when the modifications of the composition, molecular weight, and architecture of the unsaturated polyester resin are combined in addition to the composition of the reactive diluents there were significant improvements in the compressive strength of the isocyanate-free foams with minimal impacts on foam density.

Example 2

Foam Formulation—Physical Blowing Agents

Several 2-part (1:1 mix ratio) formulations were prepared. To prepare these two-part formulations, a mixing/dispenser was assembled using two 300 cc Parr pressure vessels. The components of part A and B were separately charged to glass liners suited to the Parr vessels. The reactors were each equipped with a $CO_2$ gas inlet, pressure gauge, overhead mechanical stirrer, and a dip tube exit connected to a manifold equipped with dual actuating ball valves and a static mixer. The two Parr vessels were connected to a common $CO_2$ manifold. The vessels were typically purged briefly with $CO_2$ then pressurized to 45-90 psi for about 30 minutes. When the ball valves are actuated, parts A&B flowed separately through the manifold and entered the static mixer where they mixed and exited as froth. This apparatus is similar to pressure delivery equipment used in the spray foam industry.

Foam was allowed to cure for at least 24 hours. Cured foam was cut into nominally 2×2×2 inch cubes, density was determined gravimetrically, and compressive strength was measured per ASTM methods. Tables 6-9 lists the A-side formulation for samples 1-26 and Tables 10-13 lists the B-side formulation for samples 1-25.

TABLE 6

| A-side | Sample 1 (wt %) | Sample 2 (wt %) | Sample 3 (wt %) | Sample 4 (wt %) | Sample 5 (wt %) | Sample 6 (wt %) | Sample 7 (wt %) | Sample 8 (wt %) |
|---|---|---|---|---|---|---|---|---|
| Trimethylolpropane triacrylate (TMPTA) | — | 10 | 10 | 10 | 10 | 10 | 10 | 10 |
| Dipropylene glycol diacrylate | — | 17.8 | 17.8 | 17.8 | 17.8 | 17.8 | 17.8 | 17.8 |
| Unsaturated polyester in DPGDA (THPA resin) | 57.69 | — | — | — | — | — | — | — |
| UPR 6 | — | 54 | 54 | 54 | 53.6 | 54 | 54 | 52.6 |
| Synthetic, amorphous silica | 1 | 1 | 1 | 1 | 1 | — | — | 1 |
| Hydrophobic fumed silica | — | — | — | — | — | 1 | — | — |
| Silicone (polysiloxane) surfactant, Evonik | 0.4 | 0.4 | 0.4 | 0.4 | 0.4 | 0.4 | 0.4 | 0.4 |
| 2,4-pentanedione peroxide | — | 1.2 | 1.2 | 1.2 | 1.2 | 1.2 | 1.2 | 1.2 |
| 40% BPO in plasticizer | — | — | — | — | — | — | — | 3 |
| Trans-1,3,3,3-tetrafluoroprop-1-ene | 7 | 4.67 | 7 | — | 4.67 | 4.67 | 4.67 | 4.67 |

TABLE 6-continued

| A-side | Sample 1 (wt %) | Sample 2 (wt %) | Sample 3 (wt %) | Sample 4 (wt %) | Sample 5 (wt %) | Sample 6 (wt %) | Sample 7 (wt %) | Sample 8 (wt %) |
|---|---|---|---|---|---|---|---|---|
| Hydrofluoro-carbon 1,1,1,3,3-pentafluoro-propane | 7 | 9.33 | 7 | 14 | 9.33 | 9.33 | 9.33 | 9.33 |

TABLE 7

| A-side | Sample 9 (wt %) | Sample 10 (wt %) | Sample 11 (wt %) | Sample 12 (wt %) | Sample 13 (wt %) | Sample 14 (wt %) | Sample 15 (wt %) | Sample 16 (wt %) |
|---|---|---|---|---|---|---|---|---|
| Trimethylol-pro-pane triacrylate (TMPTA) | 10 | — | 10 | — | 10 | — | 10 | — |
| Tris (2-hydroxyethyl) isocyanurate triacrylate | — | — | — | — | — | 10 | — | — |
| Dipropylene glycol diacrylate | 17.8 | — | 17.8 | 17.8 | 17.8 | 17.8 | 17.8 | 17.8 |
| Tripropylene glycol diacrylate | — | — | — | — | — | — | — | 10 |
| Unsaturated polyester in DPGDA (THPA resin) | — | 56.29 | — | — | — | — | — | — |
| UPR 6 | 52.5 | — | — | — | — | — | — | — |
| UPR 7 | — | — | 52.6 | 52.6 | 52.6 | 52.6 | 52.78 | 52.78 |
| Synthetic, amorphous silica | — | 1 | 1 | 1 | 1 | 1 | 1 | 1 |
| Hydrophobic fumed silica | 2.5 | — | — | — | — | — | — | — |
| Silicone (polysiloxane) surfactant, Evonik | 0.4 | 0.8 | 0.4 | 0.4 | — | 0.4 | 0.4 | 0.4 |
| 2,4-pentanedione eperoxide | 1.2 | — | 1.2 | 1.2 | 1.2 | 1.2 | — | — |
| 40% BPO in plasticizer | — | — | 3 | 3 | 3 | 3 | 4.02 | 4.02 |
| Trans-1,3,3,3-tetrafluoroprop-1-ene | 4.67 | 7 | 4.67 | 4.67 | 4.67 | 4.67 | 4.67 | 4.67 |
| Hydrofluoro-carbon-1,1,1,3,3-pentafluoro-propane | 9.33 | 7 | 9.33 | 9.33 | 9.33 | 9.33 | 9.33 | 9.33 |

TABLE 8

| A-side | Sample 17 (wt %) | Sample 18 (wt %) | Sample 19 (wt %) | Sample 20 (wt %) | Sample 21 (wt %) | Sample 22 (wt %) | Sample 23 (wt %) |
|---|---|---|---|---|---|---|---|
| Trimethylolpropane triacrylate (TMPTA) | — | — | 10 | 10 | — | — | — |
| Dipropylene glycol diacrylate | 17.8 | 17.8 | 17.8 | 17.8 | 17.8 | 19 | 19 |

TABLE 8-continued

| A-side | Sample 17 (wt %) | Sample 18 (wt %) | Sample 19 (wt %) | Sample 20 (wt %) | Sample 21 (wt %) | Sample 22 (wt %) | Sample 23 (wt %) |
|---|---|---|---|---|---|---|---|
| Tetraacrylate | 10 | — | — | — | — | — | — |
| Pentaacrylate | — | 10 | — | — | 10 | 10 | — |
| Polyester acrylate oligomer | — | — | — | — | — | — | 10 |
| UPR 7 | 52.78 | 52.78 | 52.78 | 52.78 | 52.78 | 51.58 | 51.58 |
| Synthetic, amorphous silica | 1 | 1 | — | — | — | — | — |
| Hydrophobic fumed silica | — | — | 1 | 1 | 1 | 1 | 1 |
| Silicone (polysiloxane) surfactant, Evonik | 0.4 | 0.4 | 0.4 | — | 0.4 | 0.4 | 0.4 |
| Momentive Y-10993 silicone | — | — | — | 0.4 | — | — | — |
| 40% BPO in plasticizer | 4.02 | 4.02 | 4.02 | 4.02 | 4.02 | 4.02 | 4.02 |
| Trans-1,3,3,3-tetrafluoroprop-1-ene | 4.67 | 4.67 | 4.67 | 4.67 | 4.67 | 4.67 | 4.67 |
| Hydrofluorocarbon-1,1,1,3,3-pentafluoropropane | 9.33 | 9.33 | 9.33 | 9.33 | 9.33 | 9.33 | 9.33 |

TABLE 9

| A-side | Sample 24 (wt %) | Sample 25 (wt %) | Sample 26 (wt %) |
|---|---|---|---|
| Methyl cinnamate | — | — | 5.00% |
| Polyester acrylate oligomer | 10.00% | 10.00% | 10.00% |
| 2-hydroxyethyl methacrylate | 10.00% | 10.00% | — |
| Dipropylene glycol diacrylate | 10.00% | 10.00% | 15.00% |
| UPR 8 | 50.00% | 50.00% | 50.00% |
| Hydrophobic fumed silica | 1.00% | 1.00% | 1.00% |
| N-(2-hydroxyethyl)-N-methyl-para-toluidine | 0.75% | 0.75% | 0.75% |
| Momentive Y-10993 silicone | 0.40% | 0.40% | 0.40% |
| 1,1,1,3,3-pentafluoropropane | 14.00% | 28.00% | 14.00% |

TABLE 10

| B-side | Sample 1 (wt %) | Sample 2 (wt %) | Sample 3 (wt %) | Sample 4 (wt %) | Sample 5 (wt %) | Sample 6 (wt %) | Sample 7 (wt %) | Sample 8 (wt %) |
|---|---|---|---|---|---|---|---|---|
| Trimethylolpropane triacrylate (TMPTA) | — | 10 | 10 | 10 | 10 | 10 | 10 | 10 |
| Dipropylene glycol diacrylate | — | 22.2 | 22.2 | 22.2 | 22.2 | 22.2 | 22.2 | 22.2 |
| Unsaturated polyester in DPGDA | 57.49 | — | — | — | — | — | — | — |
| UPR 6 | — | 50.89 | 50.89 | 50.89 | 50.89 | 50.89 | 50.89 | 50.89 |
| Synthetic, amorphous silica | 1 | 1 | 1 | 1 | 1 | — | — | 1 |
| Hydrophobic fumed silica | — | — | — | — | — | 1 | — | — |
| N-(2-hydroxyethyl)-N-methyl-para-toluidine | 1.5 | 1.5 | 1.5 | 1.5 | 1.5 | 1.5 | 1.5 | 1.5 |
| Silicone (polyslioxane) surfactant available from Evonik | 0.8 | 0.4 | 0.4 | 0.4 | 0.4 | 0.4 | 0.4 | 0.4 |
| 1,4-Bis(pentylamino) anthraquinone | 0.01 | 0.01 | 0.01 | 0.01 | 0.01 | 0.01 | 0.01 | 0.01 |
| Trans-1,3,3,3-tetrafluoroprop-1-ene | 7 | 4.67 | 7 | — | 4.67 | 4.67 | 4.67 | 4.67 |
| Hydrofluorocarbon-1,1,1,3,3-pentafluoropropane | 7 | 9.33 | 7 | 14 | 9.33 | 9.33 | 9.33 | 9.33 |

TABLE 11

| B-side | Sample 9 (wt %) | Sample 10 (wt %) | Sample 11 (wt %) | Sample 12 (wt %) | Sample 13 (wt %) | Sample 14 (wt %) | Sample 15 (wt %) | Sample 16 (wt %) |
|---|---|---|---|---|---|---|---|---|
| Trimethylolpropane triacrylate (TMPTA) | 10 | — | 10 | — | 10 | — | 10 | — |
| Tris (2-hydroxyethyl)iso-cyanurate triacrylate | — | — | — | — | — | 10 | — | — |
| Dipropylene glycol diacrylate | 22.2 | — | 22.2 | 22.2 | 22.2 | 22.2 | 22.2 | 22.2 |
| Tripropylene glycol diacrylate | — | — | — | — | — | — | — | 10 |
| Unsaturated polyester in DPGDA | — | 55.69 | — | — | — | — | — | — |
| UPR 6 | 49.39 | — | — | — | — | — | — | — |
| UPR 7 | — | — | 50.89 | 50.89 | 50.89 | 50.89 | 50.89 | 50.89 |
| Synthetic, amorphous silica | — | 1 | 1 | 1 | 1 | 1 | 1 | 1 |
| Hydrophobic fumed silica | 2.5 | — | — | — | — | — | — | — |
| N-(2-hydroxyethyl)-N-methyl-para-toluidine | 1.5 | 1.5 | 1.5 | 1.5 | 1.5 | 1.5 | 1.5 | 1.5 |
| Silicone (polysiloxane) surfactant, Evonik | 0.4 | 1.6 | 0.4 | 0.4 | — | 0.4 | 0.4 | 0.4 |
| 1,4-Bis(pentylamino)anthraquinone] | 0.01 | 0.01 | 0.01 | 0.01 | 0.01 | 0.01 | 0.01 | 0.01 |
| Trans-1,3,3,3-tetrafluoroprop-1-ene | 4.67 | 7 | 4.67 | 4.67 | 4.67 | 4.67 | 4.67 | 4.67 |
| Hydrofluorocarbon-1,1,1,3,3-pentafluoropropane | 9.33 | 7 | 9.33 | 9.33 | 9.33 | 9.33 | 9.33 | 9.33 |

TABLE 12

| B-side | Sample 17 (wt %) | Sample 18 (wt %) | Sample 19 (wt %) | Sample 20 (wt %) | Sample 21 (wt %) | Sample 22 (wt %) | Sample 23 (wt %) |
|---|---|---|---|---|---|---|---|
| Trimethylolpropane triacrylate (TMPTA) | — | — | 10 | 10 | — | — | — |
| Dipropylene glycol diacrylate | 22.2 | 22.2 | 22.2 | 22.2 | 22.2 | 21 | 21 |
| tetraacrylate | 10 | — | — | — | — | — | — |
| pentaacrylate | — | 10 | — | — | 10 | 10 | — |
| Polyester acrylate oligomer | — | — | — | — | — | — | 10 |
| UPR 7 | 50.89 | 50.89 | 50.89 | 50.89 | 50.89 | 52.09 | 52.09 |
| Synthetic, amorphous silica | 1 | 1 | — | — | — | — | — |
| Hydrophobic fumed silica | — | — | 1 | 1 | 1 | 1 | 1 |
| N-(2-hydroxyethyl)-N-methyl-para-toluidine | 1.5 | 1.5 | 1.5 | 1.5 | 1.5 | 1.5 | 1.5 |
| Silicone (polysiloxane) surfactant, Evonik | 0.4 | 0.4 | 0.4 | — | 0.4 | 0.4 | 0.4 |
| Momentive Y-10993 silicone | — | — | — | 0.4 | — | — | — |
| 1,4-Bis(pentylamino)anthraquinone | 0.01 | 0.01 | 0.01 | 0.01 | 0.01 | 0.01 | 0.01 |
| Trans-1,3,3,3-tetrafluoroprop-1-ene | 4.67 | 4.67 | 4.67 | 4.67 | 4.67 | 4.67 | 4.67 |

TABLE 12-continued

| B-side | Sample 17 (wt %) | Sample 18 (wt %) | Sample 19 (wt %) | Sample 20 (wt %) | Sample 21 (wt %) | Sample 22 (wt %) | Sample 23 (wt %) |
|---|---|---|---|---|---|---|---|
| Hydrofluorocarbon-1,1,1,3,3-pentafluoropropane | 9.33 | 9.33 | 9.33 | 9.33 | 9.33 | 9.33 | 9.33 |

TABLE 13

| B-side | Sample 24 (wt %) | Sample 25 (wt %) | Sample 26 (wt %) |
|---|---|---|---|
| Methyl cinnamate | — | — | 5.00% |
| Polyester acrylate oligomer | 10.00% | 10.00% | 10.00% |
| 2-hydroxyethyl methacrylate | 10.00% | 10.00% | — |
| Dipropylene glycol diacrylate | 10.00% | 10.00% | 15.00% |
| UPR 8 | 50.00% | 50.00% | 50.00% |
| Hydrophobic fumed silica | 1.00% | 1.00% | 1.00% |
| Silicone (polysiloxane) surfactant, Evonik | 0.40% | 0.40% | 0.40% |
| 40% BPO in plasticizer | 2.00% | 2.00% | 2.00% |
| 1,1,1,3,3-pentafluoropropane | 14.00% | 28.00% | 14.00% |

Example 3

Foam Formulations—Chemical Blowing Agents

Components of part A and part B were mixed mechanically for 30 seconds at high speed. Parts A&B were loaded into a two part adhesive dispensing cartridge. The cartridge was warmed in a 45° C. oven for 20 minutes prior to dispensing. A Sultzer MIXPAC model DP 200-70 pneumatic two-part adhesive dispenser was used to dispense the two parts through a static mixer into a suitable container. Foam was allowed to cure for at least 24 hours. Cured foam was cut into nominally 2×2×2 inch cubes, density was determined gravimetrically, and compressive strength was measured per ASTM methods. All examples are chemically blown formulations and utilize commercially available UPR.

TABLE 14

| Foam Components | Sample 26 Part A | Sample 26 Part B | Sample 27 Part A | Sample 27 Part B | Sample 28 Part A | Sample 28 Part B |
|---|---|---|---|---|---|---|
| SR306F | — | — | — | — | 5.00% | 17.00% |
| HEMA | 10.00% | 10.00% | 22.00% | 5.00% | 11.00% | — |
| SR502 | 10.00% | 10.00% | — | — | — | — |
| Laromer UP35 D | 30.30% | 44.30% | — | — | — | — |
| Laromer 9118 | — | — | 23.55% | 65.30% | 29.55% | 53.30% |
| MHPT | — | 1.00% | — | 1.00% | — | 1.00% |
| HEMA phosphate | — | 14.00% | — | 14.00% | — | 14.00% |
| MAA | — | 14.00% | — | 14.00% | — | 14.00% |
| NaHCO$_3$ 9 micron | 25.00% | — | 25.00% | — | 25.00% | — |
| DISPERBIK K108 | 1.00% | — | 1.00% | — | 1.00% | — |
| L-6915 | 0.70% | 0.70% | 0.70% | 0.70% | 0.70% | 0.70% |
| Benox L-40LV | — | — | 3.75% | — | 3.75% | — |
| Perkadox L-40 | 3.00% | — | — | — | — | — |
| water | 20.00% | 6.00% | 24.00% | — | 24.00% | — |
| Rise time (sec) | 175 | | n/a | | n/a | |
| Density (pcf) | 2.29 | | 2.37 | | 2.26 | |
| Compressive strength @ 10% strain (psi) | 0.6 | | 1.88 | | 0.47 | |
| @ 20% strain | 0.69 | | 1.99 | | 0.83 | |
| @ 50% strain | 0.84 | | 2.52 | | 1.31 | |

Laromer UP35D and Laromer 9118 are commercially available UPRs from BASF. These UPRs utilize multifunctional acrylates as the reactive diluents. These examples enable chemically blown foams of moderately low density and low to moderate compressive strength.

TABLE 15

| Foam Components | Sample 29 Part A | Sample 29 Part B | Sample 30 Part A | Sample 30 Part B | Sample 31 Part A | Sample 31 Part B |
|---|---|---|---|---|---|---|
| SR344 | 10.00% | — | 10.00% | — | 10.00% | — |
| HEMA | — | 23.13% | — | 23.13% | — | 23.13% |
| SR502 | 17.00% | — | 17.00% | — | 17.00% | — |
| Aropol MR13050 | 45.80% | 27.79% | 45.80% | 26.54% | 45.30% | 26.54% |
| MHPT | 0.50% | — | 0.50% | — | 1.00% | — |
| HEMA phosphate Aldrich | 9.00% | — | 9.00% | — | 9.00% | — |
| MAA | 17.00% | — | 17.00% | — | 17.00% | — |

TABLE 15-continued

| Foam | Sample 29 | | Sample 30 | | Sample 31 | |
|---|---|---|---|---|---|---|
| Components | Part A | Part B | Part A | Part B | Part A | Part B |
| NaHCO$_3$ 9 micron | — | 24.00% | — | 24.00% | — | 24.00% |
| DC 5990 | 0.70% | 0.70% | 0.70% | 0.70% | 0.70% | 0.70% |
| Perkadox L-40 | — | 2.50% | — | 3.75% | — | 3.75% |
| water | — | 21.88% | — | 21.88% | — | 21.88% |
| Rise time (sec) | | 223 | | 177 | | 120 |
| Density (pcf) | | 1.87 | | 1.89 | | 1.72 |
| Compressive strength @ 10% strain (psi) | | 3.57 | | 3.16 | | 2.02 |
| @ 20% strain | | 4.17 | | 3.61 | | 2.42 |
| @ 50% strain | | 5.22 | | 4.21 | | 2.88 |

Aropol MR 13050 is a commercially available UPR from Ashland LLC. This UPR utilizes vinyl toluene as a reactive diluent. These examples of chemically blown isocyanate free foam, show the effect of changing levels of initiator and promoter on the density compressive strength and foam rise time.

TABLE 16

| Foam | Sample 32 | | Sample 33 | | Sample 34 | |
|---|---|---|---|---|---|---|
| Components | Part A | Part B | Part A | Part B | Part A | Part B |
| TMPTA | — | — | 10.00% | — | — | — |
| SR344 | — | — | — | — | — | — |
| SR252 | 10.00% | — | — | — | 10.00% | — |
| HEMA | — | 23.00% | 5.00% | 23.00% | — | 23.00% |
| SR502 | 12.00% | — | 12.00% | — | 12.00% | — |
| Aropol MR13050 | 50.30% | 25.67% | 45.30% | 25.67% | 48.30% | 25.92% |
| Zinc diacrylate | — | — | — | — | 2.00% | — |
| MHPT | 1.00% | — | 1.00% | — | 1.00% | — |
| Harcryl 1228M | 9.00% | — | 9.00% | — | 9.00% | — |
| MAA | 17.00% | — | 17.00% | — | 17.00% | — |
| NaHCO$_3$ 9 micron | — | 24.00% | — | 24.00% | — | 24.00% |
| DISPERBIK K108 | — | 1.00% | — | 1.00% | — | 1.00% |
| DC 5990 | 0.70% | 0.70% | 0.70% | 0.70% | 0.70% | 0.70% |
| Benox L-40LV | — | 3.75% | — | 3.75% | — | 3.75% |
| water | — | 21.88% | — | 21.88% | — | 21.88% |
| Rise time (sec) | | 129 | | 137 | | 263 |
| Density (pcf) | | 1.66 | | 1.74 | | 1.69 |
| Compressive strength @ 10% strain (psi) | | 2.77 | | 3.46 | | 3.1 |
| @ 20% strain | | 2.83 | | 3.70 | | 3.23 |
| @ 50% strain | | 3.53 | | 4.17 | | 3.79 |

These examples show the effect that varying the type and functionality of the acrylate reactive diluents can have upon the foam rise time, density and compressive strength.

TABLE 17

| Foam | Sample 35 | | Sample 36 | | Sample 37 | |
|---|---|---|---|---|---|---|
| Components | Part A | Part B | Part A | Part B | Part A | Part B |
| Benzyl methacrylate | — | — | — | — | 12.00% | — |
| SR252 | 10.00% | — | 10.00% | — | 10.00% | — |
| HEMA | — | 23.00% | — | 23.00% | — | 23.00% |
| SR502 | 12.00% | — | 12.00% | — | — | — |
| Aropol MR13050 | 49.50% | 25.37% | 49.00% | 25.37% | 49.50% | 25.37% |
| MHPT | 1.00% | — | 1.00% | — | 1.00% | — |
| Harcryl 1228M | 9.00% | — | 9.00% | — | 9.00% | — |
| MAA | 17.00% | — | 17.00% | — | 17.00% | — |
| NaHCO$_3$ 9 micron | — | 24.00% | — | 24.00% | — | 24.00% |
| DISPERBIK K108 | — | 1.00% | — | 1.00% | — | 1.00% |
| Tegostab 8239 | 1.00% | 1.00% | 1.00% | 1.00% | 1.00% | 1.00% |
| Byk-S 760 | 0.50% | — | 1.00% | — | 0.50% | — |
| Benox L-40LV | — | 3.75% | — | 3.75% | — | 3.75% |
| water | — | 21.88% | — | 21.88% | — | 21.88% |

TABLE 17-continued

| Foam | Sample 35 | | Sample 36 | | Sample 37 | |
|---|---|---|---|---|---|---|
| Components | Part A | Part B | Part A | Part B | Part A | Part B |
| Rise time (sec) | | 130 | | 125 | | 171 |
| Density (pcf) | | 1.83 | | 2.13 | | 2.01 |
| Compressive strength @ 10% strain (psi) | | 3.27 | | 4.12 | | 3.04 |
| @ 20% strain | | 3.40 | | 4.40 | | 3.32 |
| @ 50% strain | | 3.92 | | 5.22 | | 4.01 |

Samples 35-37 further illustrate the effects that additives and diluents can have on foam rise time, density, and compressive strength.

TABLE 18

| Foam | Sample 38 | | Sample 39 | | Sample 40 | |
|---|---|---|---|---|---|---|
| Components | Part A | Part B | Part A | Part B | Part A | Part B |
| SR252 | 10.00% | — | — | 10.00% | — | 10.00% |
| HEMA | — | 23.00% | 3.00% | 20.00% | 3.00% | 20.00% |
| SR502 | 12.00% | — | — | — | — | — |
| SR454 | — | — | 12.00% | — | — | — |
| SR415 | — | — | — | — | 4.00% | — |
| Aropol MR13050 | 50.00% | 25.37% | 54.00% | 20.25% | 62.00% | 20.25% |
| MHPT | 1.00% | — | 1.00% | — | 1.00% | — |
| Harcryl 1228M | 9.00% | — | 9.00% | — | 9.00% | — |
| MAA | 17.00% | — | 17.00% | — | 17.00% | — |
| NaHCO$_3$ 9 micron | — | 24.00% | — | 24.00% | — | 24.00% |
| DISPERBIK K108 | — | 1.00% | — | — | — | — |
| Tegostab 8239 | 0.90% | 0.90% | 1.00% | 1.00% | 1.00% | 1.00% |
| L-6915 | 0.10% | 0.10% | — | — | — | — |
| Sorbitan monostearate | — | — | — | 1.00% | — | 1.00% |
| Byk-S 760 | — | — | 1.00% | — | 1.00% | — |
| Benox L-40LV | — | 3.75% | — | 3.75% | — | 3.75% |
| water | — | 21.88% | 2.00% | 20.00% | 2.00% | 20.00% |
| Rise time (sec) | | 126 | | 94 | | 119 |
| Density (pcf) | | 2.06 | | 1.74 | | 1.87 |
| Compressive strength @ 10% strain (psi) | | 4.43 | | 2.24 | | 2.30 |
| @ 20% strain | | 4.57 | | 2.31 | | 2.58 |
| @ 50% strain | | 5.20 | | 2.92 | | 3.32 |

Samples 38-40 further illustrate the effects that additives and diluents can have on foam rise time, density, and compressive strength.

What is claimed is:

1. A method of making a foam, the method comprising:
   providing a formulation comprising:
   at least one unsaturated polyester comprising a reaction product of at least one unsaturated cyclic anhydride, dicyclopentadiene, and at least one polyol;
   at least one reactive diluent,
   at least one initiator; and
   a chemical blowing agent;
   expanding the formulation to create a froth; and
   curing the froth by free radical polymerization to produce a foam, wherein the foam has a density of less than 30 pounds per cubic foot, wherein the density is the apparent density measured according to ASTM D 1622-08 and a compressive strength of less than 40 pounds per square inch at 10% strain measured according to ASTM 1621-00, as modified by reference to 10% strain.

2. The method of claim 1, further comprising a surfactant.

3. The method of claim 1, wherein the at least one unsaturated cyclic anhydride comprises at least one member selected from the group consisting of maleic anhydride, methyltetrahydrophthalic anhydride, tetrahydrophthalic anhydride, and phthalic anhydride.

4. The method of claim 1, wherein the at least one polyol comprises at least one member selected from the group consisting of ethylene glycol, diethylene glycol, propylene glycol, butane diol, neopentyl glycol, glycerol, pentaerythritol, 1,10-decanediol, sucrose, glucose, trimethylolpropane, and sorbitol.

5. The method of claim 1, wherein the at least one polyol has a molecular weight of 2900 or less.

6. The method of claim 1, wherein the at least one reactive diluent comprises at least one member selected from the group consisting of 2-(hydroxyethyl)methacrylate maleate, acrylates, divinylbenzene, methyl methacrylate, phosphate esters of 2-(hydroxyethyl)methacrylate, phosphate esters of 2-(hydroxyethyl)acrylate, vinyl ethers, vinyl esters, vinyl toluene, and styrene.

7. The method of claim 6, wherein the acrylates comprise at least one member selected from the group consisting of 2-(hydroxyethyl)acrylate, 2-(hydroxyethyl)methacrylate, dipropylene glycol diacrylate, tripropylene glycol diacrylate, acrylated polyester oligomers, bisphenol A diacrylates, epoxy acrylates, isobornyl acrylate, PEG 600 diacrylate, polyethylene glycol diacrylates, polypropylene glycol diacrylates, trimethylolpropane triacrylate, ethoxylated trimethylolpropane triacrylate, propoxylated trimethylolpropane triacrylate, polyester acrylate, polyester acrylate oligomer, and zinc diacrylate.

8. The method of claim 1, wherein the method further comprises activating the at least one initiator in the froth.

9. The method of claim 1, wherein the at least one initiator is a peroxide comprises at least one member selected from the group consisting of benzoyl peroxide, dilauryl peroxide, 2,4-pentanedione peroxide, and methyl ethyl ketone peroxide.

10. The method of claim 1, further comprising at least one additive which comprises at least one member selected from the group consisting of nucleating agent, cure promoter, surfactants, dyes, flame retardants, pigment dispersing agents, and reinforcing agents.

11. The method of claim 10, wherein the nucleating agent is a silica.

12. The method of claim 10, wherein the cure promoter is an amine which comprises at least one member selected from the group consisting of N,N-dimethyl aniline, N-methylaniline, N,N-dimethyltoluidine, N-methyltoluidine, N-(2-hydroxyethyl)-N-methyl-para-toluidine, N-alkyl aniline, and N-alkyl toluidine.

13. The method of claim 12, wherein the amine is N-(2-hydroxyethyl)-N-methyl-para-toluidine.

14. The method of claim 10, wherein the formulation has two parts and a first part comprises the cure promoter and a second part comprises the at least one initiator.

15. The method of claim 10, wherein the chemical blowing agent comprises a reactive acidic diluent and a salt of bicarbonate or carbonate, and wherein the formulation has two parts, wherein the first part comprises the cure promoter and the reactive acidic diluent and the second part comprises the at least one initiator and the salt of bicarbonate or carbonate.

16. The method of claim 10, wherein the chemical blowing agent comprises a reactive acidic diluent and a salt of bicarbonate or carbonate, and wherein the formulation has two parts, wherein the first part comprises the at least one initiator and the reactive acidic diluent and the second part comprises the cure promoter and the salt of bicarbonate or carbonate.

17. The method of claim 1, wherein the foam has a density of less than 2 pounds per cubic foot and compressive strength of 3-7 pounds per square inch at 10% strain measured according to ASTM 1621-00, as modified by reference to 10% strain.

18. The method of claim 1, wherein the foam has a density of between 1 and 5 pounds per cubic foot and compressive strength of 1-15 pounds per square inch at 10% strain measured according to ASTM 1621-00, as modified by reference to 10% strain.

19. The method of claim 1, wherein the reactive diluent is an acrylate.

* * * * *